United States Patent
Dzieia

(10) Patent No.: US 12,066,309 B2
(45) Date of Patent: Aug. 20, 2024

(54) VARIABLE AREA FLOWMETER, SYSTEM COMPRISING A VARIABLE AREA FLOWMETER AND AN EXTERNAL CONTROL UNIT, AND METHOD FOR OPERATING A VARIABLE AREA FLOWMETER

(71) Applicant: KROHNE Messtechnik GmbH, Duisburg (DE)

(72) Inventor: Colin Dzieia, Bochum (DE)

(73) Assignee: KROHNE Messtechnik GmbH, Duisburg (DE)

( * ) Notice: Subject to any disclaimer, the term of this patent is extended or adjusted under 35 U.S.C. 154(b) by 218 days.

(21) Appl. No.: 16/662,147

(22) Filed: Oct. 24, 2019

(65) Prior Publication Data

US 2020/0132525 A1   Apr. 30, 2020

(30) Foreign Application Priority Data

Oct. 26, 2018   (DE) ...................... 10 2018 126 790.8

(51) Int. Cl.
  *G01F 1/24*   (2006.01)
  *G01F 1/26*   (2006.01)
  *G01F 1/40*   (2006.01)
  *G02F 1/139*   (2006.01)

(52) U.S. Cl.
  CPC .................. *G01F 1/26* (2013.01); *G01F 1/40* (2013.01); *G02F 1/1391* (2013.01)

(58) Field of Classification Search
  CPC ................................................. G01F 1/22–26
  See application file for complete search history.

(56) References Cited

U.S. PATENT DOCUMENTS

| | | | | |
|---|---|---|---|---|
| 3,315,523 A | * | 4/1967 | Conkling | G01F 1/24 310/104 |
| 4,195,518 A | * | 4/1980 | Fees | G01F 1/22 116/204 |
| 4,263,813 A | * | 4/1981 | Gryn | G01D 5/06 D15/123 |

(Continued)

FOREIGN PATENT DOCUMENTS

| | | |
|---|---|---|
| DE | 7730466 U1 | 4/1978 |
| DE | 202005016292 U1 | 12/2005 |

(Continued)

OTHER PUBLICATIONS

English Translation of DE-102013019610-B4 (Year: 2017).*
English Translation of DE-102015102562-A1 (Year: 2016).*

*Primary Examiner* — Alexander A Mercado
(74) *Attorney, Agent, or Firm* — David S. Safran; Calderon Safran & Wright, PC

(57) ABSTRACT

A variable area flowmeter having a float and having a display unit, the display unit includes a pointer element, the pointer element is connected directly or indirectly to the float such that the pointer element is mechanically deflected by the float during the measuring process. The variable area flowmeter that operates particularly reliably and is flexibly applicable at the same time is achieved in that the display unit comprises at least one bi-stable display which only requires an energy supply in order to modify the displayed representation and/or to restore the representation.

12 Claims, 5 Drawing Sheets

(56) References Cited

U.S. PATENT DOCUMENTS

| | | | | |
|---|---|---|---|---|
| 4,461,175 A | * | 7/1984 | Baumgart | G01F 23/24 |
| | | | | 73/304 R |
| 4,656,874 A | * | 4/1987 | Kulig | G01F 1/22 |
| | | | | 73/198 |
| 4,944,190 A | * | 7/1990 | Scally | G01F 1/22 |
| | | | | 73/861.58 |
| 5,187,988 A | * | 2/1993 | Dettmer | G01F 15/06 |
| | | | | 73/861.56 |
| 6,032,541 A | | 3/2000 | Haak | |
| 6,079,279 A | * | 6/2000 | Bussow | G01F 1/24 |
| | | | | 73/861.56 |
| 9,121,682 B2 | | 9/2015 | Hayashi et al. | |
| 2012/0024054 A1 | * | 2/2012 | Huang | G01F 1/6845 |
| | | | | 73/204.26 |
| 2012/0053436 A1 | | 3/2012 | Sauers et al. | |
| 2015/0005955 A1 | * | 1/2015 | Gregor | G05D 7/0664 |
| | | | | 700/282 |
| 2015/0005956 A1 | * | 1/2015 | Gregor | G05D 7/0664 |
| | | | | 700/282 |
| 2016/0216702 A1 | * | 7/2016 | Jefferies | G05B 15/02 |
| 2016/0377459 A1 | * | 12/2016 | Faeth | G01L 7/04 |
| | | | | 116/292 |
| 2018/0246532 A1 | * | 8/2018 | Nakamura | G05D 11/132 |
| 2019/0094053 A1 | * | 3/2019 | Bayer | G01F 1/74 |
| 2019/0120671 A1 | * | 4/2019 | Allen | G01F 1/22 |

FOREIGN PATENT DOCUMENTS

| | | | | |
|---|---|---|---|---|
| DE | 102014117179 A1 | | 5/2016 | |
| DE | 102015102562 A1 | * | 8/2016 | |
| DE | 102015102562 A1 | | 8/2016 | |
| DE | 102013019610 B4 | * | 1/2017 | G01L 19/083 |
| EP | 2565577 A1 | * | 3/2013 | G01B 3/002 |

\* cited by examiner

VARIABLE AREA FLOWMETER, SYSTEM COMPRISING A VARIABLE AREA FLOWMETER AND AN EXTERNAL CONTROL UNIT, AND METHOD FOR OPERATING A VARIABLE AREA FLOWMETER

BACKGROUND OF THE INVENTION

Field of the Invention

The invention is based on a variable area flowmeter with a float and a display unit, wherein the display unit includes a pointer element, wherein the pointer element is directly or indirectly connected to the float such that the pointer element is mechanically deflected by the float during the measuring process.

In addition, the invention relates to a system including a variable area flowmeter and an external control unit.

Furthermore, the invention relates to a method for operating a variable area flowmeter, wherein the variable area flowmeter includes a float and a display unit, wherein the display unit includes a pointer element, wherein the pointer element is directly or indirectly connected to the float such that the pointer element is mechanically deflected by the float during the measurement process.

Variable area flowmeters that detect and represent the flow of a flowing medium through a measuring tube purely mechanically, i.e., without the use of electrical energy, are known from the state of the art. These measuring devices fundamentally have the advantage that they can be used permanently with only little maintenance effort, so that they are particularly suitable to be placed in complex measurement configurations even in places that are difficult to access.

Description of Related Art

Variable area flowmeters measure the mass or volume flow of a liquid or gaseous medium through a measuring tube.

A float is arranged inside the measuring tube, which is deflected by the flowing medium. The float is connected directly or indirectly to a pointer element so that the deflection of the float is transmitted to the pointer element during operation. According to one design, the pointer element is connected to the float in one piece or is formed by the float itself. According to a further design, the float is connected to the pointer element via a magnetic connection.

Usually, the display of a variable area flowmeter has a value scale dependent on the measuring range, so that the current measured value of the flow can be read off directly by the deflection of the pointer element.

In this respect, the flow flowing through the measuring tube can be measured and displayed in a purely mechanical manner using a variable area flowmeter.

The value scale represented by the display is created individually for the respective application within the scope of the calibration of the measuring device prior to commissioning. The value scale is determined within the scope of this calibration on the basis of the pointer position for the flow set in each case.

The disadvantage of these purely mechanical measuring devices is that the devices are manufactured and calibrated for one application at a time, so that measurements whose process parameters deviate from the intended application have a reduced measuring accuracy.

A measuring device is known from European Patent Application EP 2 693 162 A1 and corresponding U.S. Pat. No. 9,121,682 B2, whose display unit includes an e-paper display. The measured values are displayed electronically in various ways by the display unit.

German Patent Application DE 10 2015 102 562 A1 relates to a measuring device with a nameplate, wherein the nameplate is designed as an e-ink display. Such a design has the advantage that, for example, when the operating software of the measuring device is updated, the information displayed on the nameplate can also be updated so that it is not necessary to replace the nameplate.

A measuring device with a display device is known from German Utility Model DE 20 2005 016 292 U1, wherein the display means is formed by electronic paper, wherein an electronic control device is present which controls or changes the electronic paper depending on the measured values.

In addition, German Patent Application DE 10 2014 117 179 A1 and U.S. Patent Application Publication 2012/0053436 A1 also reveal measuring devices that have a display element made of electronic paper.

SUMMARY OF THE INVENTION

Based on the state of the art described above, the object of the invention is to provide a variable area flowmeter that is particularly reliable and flexible at the same time. In addition, the object of the invention is to provide a system consisting of a variable area flowmeter and an external control unit and a corresponding method for operating a variable area flowmeter.

According to a first teaching, the above-mentioned object is achieved by a variable area flowmeter described in the introduction in that the display unit includes at least one bi-stable display which only requires an energy supply in order to modify the displayed representation and/or to restore the representation. According to the invention, it has been recognized that the combination of a bi-stable display, which, on the one hand, displays the display substantially permanently without an energy supply and which, at the same time, can be modified by means of a low energy supply, and a mechanically deflectable pointer element is advantageous in that, on the one hand, the purely mechanical mode of operation of the measuring device according to the invention can be maintained and, on the other hand, the display can also be modified and thus adapted to different measuring situations.

According to one design, the display unit has at least one mechanical, e.g. printed, display and at least one bi-stable display. It is particularly preferred that the mechanical display includes a value scale and the bi-stable display includes the representation of an evaluation scale and/or the representation of at least one further process parameter.

According to a further design, the display unit has only at least one bi-stable display, so that the displayed information as a whole is only displayed by means of electronic display technology.

According to a particularly preferred design, the bi-stable display is designed as a bi-stable e-paper display or as a bi-stable liquid crystal display. These bi-stable display units can display information essentially permanently. According to one design, the display only needs to be restored at intervals of several weeks or months in order to prevent the information displayed from fading. The use of further bi-stable displays is also conceivable, wherein the display of information without energy supply is essentially retained and wherein modifications to the displayed information are possible using little energy.

According to a further preferred design, the bi-stable display shows a first representation during operation, wherein the first representation includes at least one value scale dependent on the measuring range and/or at least one further process-relevant parameter and/or an evaluation of the displayed measured values, in particular in the form of an evaluation scale, and/or a limit value and/or a total flow rate.

In the context of the present invention, the term representation refers to the totality of the information represented by the display.

The first representation may have one or more value scales. For example, two different value scales may exist for two different media. In addition, two different value scales can be displayed for the same medium with different process parameters.

Further process parameters are, in particular, pressure and/or temperature and/or type of measuring medium in the course of a measurement.

An evaluation of the displayed measured values can, for example, be displayed in the form of an evaluation scale. Preferably, the value scale is linked to the evaluation scale in such a manner that the evaluation of the displayed measured values can be read directly on the evaluation scale.

According to the next design, the display unit has an interface for connection to an external control unit, preferably a USB interface and/or a manufacturer-specific interface.

The interface is designed for connection to an external control unit, through which the display of the bi-stable display can be restored and/or at least partially modified.

According to a next design, the variable area flowmeter has an internal control unit, wherein the internal control unit is designed and arranged in such a manner that it can restore and/or at least partially modify the representation of the bi-stable display.

A modification of the first representation of the bi-stable display by an external and/or internal control unit includes, in particular, the modification of the displayed value scale and/or the appearing or disappearing of an additional value scale and/or the modification of the displayed further process-relevant parameters and/or the appearing or disappearing or a modification of the evaluation of the displayed measured values and/or the displayed limit value and/or a modification of the displayed total flow rate.

According to a preferred design, the internal control unit has a memory unit, wherein a plurality of representations is stored in the memory unit, wherein the individual representations are preferably based on different process parameters. For example, each representation has a different value scale adapted to the underlying process parameters.

The internal control unit is preferably designed in such a manner that it controls the bi-stable display such that, during operation, the display displays one of the different representations or also displays different representations simultaneously, at least temporarily.

Recording and storing the various displays can, for example, take place during the calibration of the measuring device. In detail, according to one design, calibration for different process parameters can be carried out, wherein a value scale relating to the flow is created and stored for each of the different process parameters.

According to a next design, at least one sensor element is provided for measuring a further process-relevant parameter, wherein the at least one sensor element is connected to the internal control unit in such a manner that, during operation, the measured value of the at least one further parameter is transmitted to the control unit, wherein the internal control unit is designed in such a manner that it modifies the representation of the bi-stable display at least partially depending on the measured value of the at least one sensor element.

For example, according to one design, the displayed value of the at least one further process parameter corresponds to the current measured value of this parameter, so that the displayed information is continuously updated.

According to a further advantageous design, the displayed value scale is adapted to a variation of the process parameters, preferably taking into account a tolerance range, so that the measurement error can be minimized.

Such adapting of the value scale takes place, according to one design, in that the representation of the bi-stable display is replaced by another representation, for example a representation stored in the memory unit for the current measured value of at least one further process parameter.

According to a further configuration, the internal control unit converts the value scale taking into account the modification of at least one process-relevant parameter.

The possibility of modifying the value scale has the advantage that the variable area flowmeter can be used particularly flexibly, for making the measurement of different media possible or making the measurement under different or changing process conditions possible.

According to another advantageous design, the variable area flowmeter is arranged in a bypass configuration, whereby the internal control unit is designed in such a manner that it at least partially modifies the display of the bi-stable display depending on a flow ratio value.

A first and a second measuring tube are preferably provided according to this design, wherein the first measuring tube is designed as a bypass tube to the second measuring tube. The variable area flowmeter is arranged in such a manner that it determines the flow through the first measuring tube.

An adjustable valve having a valve control unit is also provided, wherein the valve is designed and arranged such that, during operation, it adjusts the flow ratio of the flow flowing through the first measuring tube and through the second measuring tube. The valve control unit is connected to the internal control unit such that, during operation, the flow ratio value is transmitted to the internal control unit so that the internal control unit at least partially modifies the representation of the bi-stable display depending on the flow ratio value.

In detail, the internal control unit determines a correction value based on the flow ratio value so that by correcting the flow through the first measuring tube with this correction value, the total flow through the two measuring tubes can be determined.

According to one design, the internal control unit transmits the flow value to be set for the flow flowing through the first measuring tube to the valve control unit. The valve control unit sets the flow ratio value based on this setting and transmits this value to the internal control unit as previously described.

In this manner, the measuring range of the variable area flowmeter can be extended.

According to a second teaching of the present invention, the object mentioned in the introduction is achieved by a system consisting of a variable area flowmeter and an external control unit, wherein the variable area flowmeter is designed according to one of the designs described above, in that the display unit has an interface, preferably a USB interface and/or a manufacturer-specific interface, wherein the display unit is connected to the external control unit via the interface, wherein the external control unit is designed in such a manner that it can restore and/or at least partially modify the representation of the bi-stable display.

Alternatively, or in addition to the internal control unit described above, an external control unit for modifying and/or restoring the bi-stable display is provided according to this design.

According to one design of the system, the external control unit has a memory unit, wherein a plurality of representations of the display unit are stored in the memory unit, wherein the individual representations are preferably based on different process parameters.

According to a next design of the system, at least one sensor element is provided for measuring a further process-relevant parameter, wherein the at least one sensor element is connected to the external control unit in such a manner that, during operation, the measured value of the at least one further parameter is transmitted to the external control unit, wherein the external control unit is designed such that it modifies the representation of the bi-stable display at least partially depending on the measured value of the at least one sensor element.

According to a next design, the variable area flowmeter is arranged in a bypass configuration, wherein the external control unit is configured such that it at least partially modifies the representation of the bi-stable display depending on a flow ratio value. With regard to the design of the bypass configuration, reference is made to the above description of this arrangement.

In respect to the design of the external control unit, reference is made to the features of the internal control unit described above. The external control unit can also have all of the features of the internal control unit described above.

According to a third teaching of the present invention, the above object is achieved by a method for operating a variable area flowmeter in that the display unit includes a bi-stable display which only requires an energy supply to modify the displayed representation and/or to restore the representation, that an internal control unit and/or an external control unit is/are provided, and that the internal control unit and/or the external control unit modify the representation of the bi-stable display at least partially, preferably depending on at least one process parameter.

It is particularly preferred that the variable area flowmeter is designed according to one of the designs described above.

According to an advantageous design of the method, the information represented by the bi-stable display, such as, for example, at least one value scale dependent on the measuring range and/or further process-relevant parameters and/or an evaluation of the displayed measured values, in particular in the form of an evaluation scale, and/or a limit value and/or a total flow rate, is at least partially modified by the internal and/or external control unit, preferably depending on the process parameters.

Relevant process parameters are, for example, pressure, temperature or type of medium.

According to one design of the method, the displayed value scale is modified and/or an additional value scale is shown or hidden and/or the displayed other process-relevant parameters are modified and/or the evaluation of the displayed measured values is shown or hidden or modified and/or the displayed limit value is shown or hidden or modified and/or the displayed total flow rate is modified.

If different representations are stored in the memory unit of the internal or external control unit for different process parameters, the display is modified, according to one design, in that the representation based on the underlying parameter is displayed depending on the underlying process parameter and taking into account a tolerance range.

Furthermore, the influence of the variation of the process parameters at the information displayed is taken into account by the internal or external control unit in that the value scale is converted to the current values when the process parameters, which also include the type of medium, are modified.

In detail, there are now a number of possibilities for designing and further developing the variable area flowmeter and the method according to the invention. For this, reference is made both to the patent claims subordinate to the independent patent claims and to the following description of preferred embodiments with reference to the accompanying drawings.

DETAILED DESCRIPTION OF THE INVENTION

Figure 1:
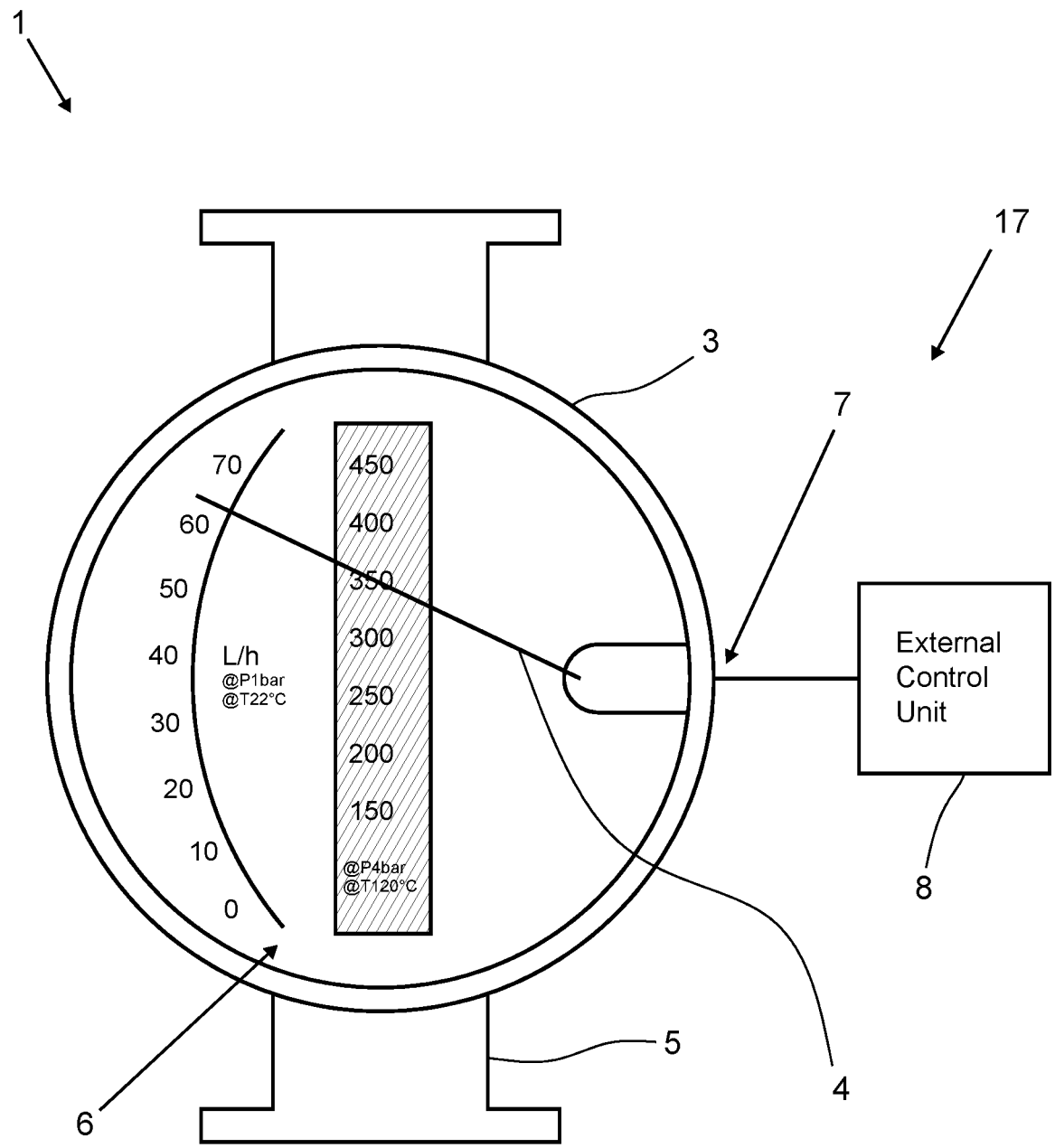
FIG. 1 shows a first embodiment of a variable area flowmeter according to the invention and a system having a variable area flowmeter and an external control unit.

FIG. 1 shows a first embodiment of a variable area flowmeter 1 having a float arranged inside the measuring tube 5 and having a display unit 3, wherein the display unit 3 includes a pointer element 4, wherein the pointer element 4 is connected directly or indirectly to the float so that the pointer element 4 is mechanically deflected by the float during the measuring process. In addition, the display unit 3 includes a bi-stable display 6 which only requires an energy supply to modify the displayed representation or to restore the representation. In the embodiment shown, the bi-stable display 6 is designed as an e-paper display. In the embodiment shown, the display of the bi-stable display 6 includes a first value scale for the process parameters pressure of 1 bar and temperature of 22° C. and, in addition, a second value scale for the process parameters pressure of 4 bar and temperature of 120° C. In this respect, all information is displayed using electronic display technology.

Thus the variable area flowmeter 1 shown in FIG. 1 has the advantage that the display 6, on the one hand without the supply of energy, essentially permanently displays the information relevant for the user and, on the other hand, can also be modified, so that a variation of the process parameters can also be taken into account when displaying the measured values. The electronic display only needs to be renewed every several weeks to avoid fading.

In addition, the variable area flowmeter 1 shown has an interface 7, via which the display unit 3 is connected to an external control unit 8, wherein the bi-stable display 6 can be modified and restored by the supply of energy via the external control unit 8.

In this respect, an embodiment of a system 17 according to the invention is also shown, consisting of a variable area flowmeter 1 and an external control unit 8.

Figure 2:
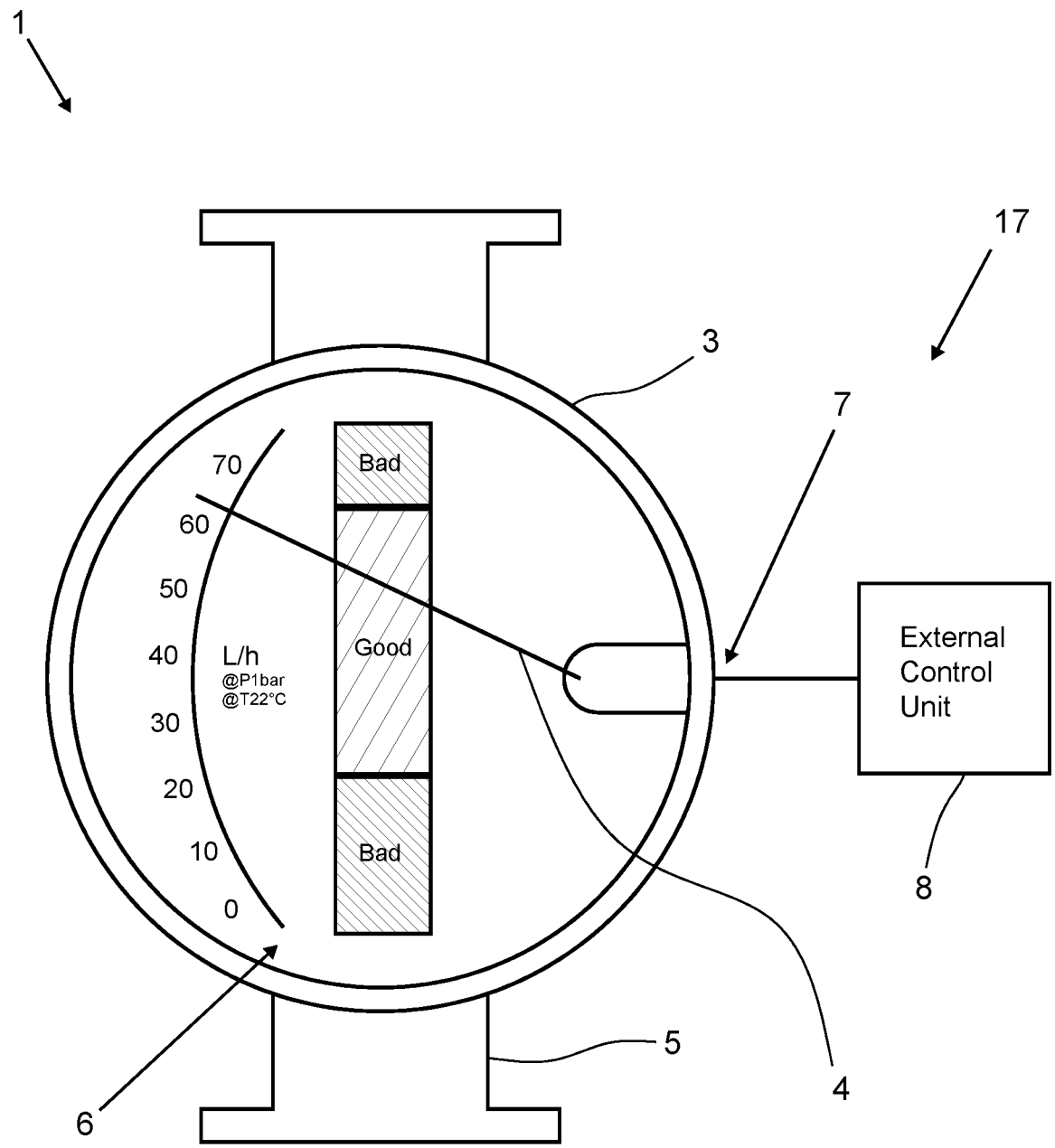
FIG. 2 shows a second embodiment of a variable area flowmeter according to the invention and a system consisting of a variable area flowmeter and an external control unit.

FIG. 2 shows another embodiment of a variable area flowmeter 1 having a float arranged inside the measuring tube 5 and having a display unit 3, wherein the display unit 3 is connected to an external control unit 8 via an interface 7.

The display unit 3 also has a bi-stable display 6 in the form of an e-paper display, which can be modified by means of the external control unit 8. Analogous to the embodiment shown in FIG. 1, all information in the embodiment shown in FIG. 2 is also displayed using electronic display technology. In contrast to the information shown in FIG. 1, display 6 shows a value scale and an evaluation scale for evaluating the displayed measured values. The advantage of the displayed representation is that it can be read immediately if the current flow rate is within the desired range.

Figure 3:
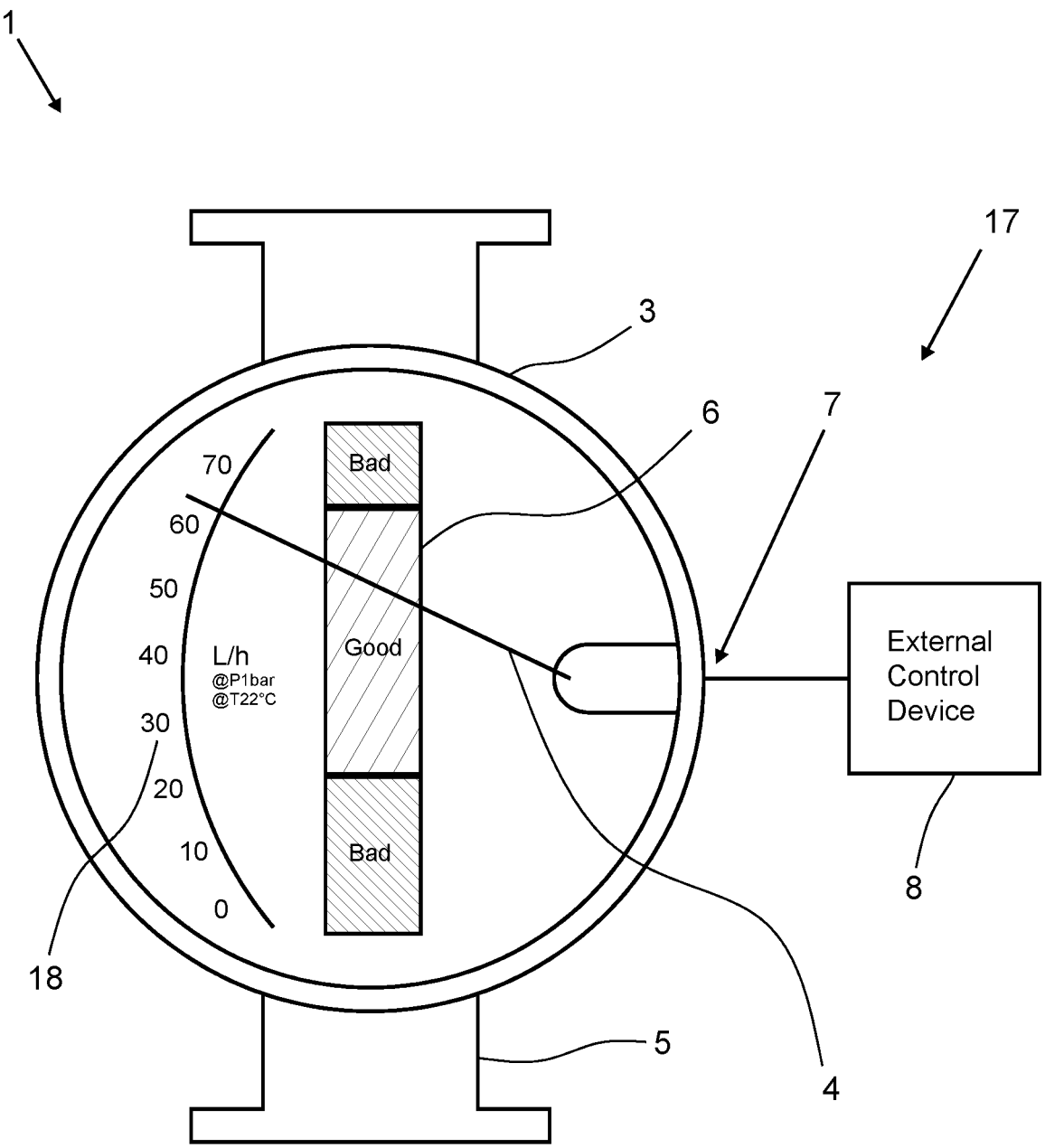
FIG. 3 shows a third embodiment of a variable area flowmeter according to the invention.

FIG. 3 shows another embodiment of a variable area flowmeter 1. In contrast to the embodiments previously shown in FIGS. 1 and 2, the display unit 3 includes both a bi-stable display 6 in the form of an evaluation scale and a mechanical value scale 18. Such a design can be used particularly advantageously in systems with essentially constant process conditions, wherein, for example, in the case of a large number of measuring devices that are used at different points in the measuring system, different flow ranges are marked as advantageous by means of the evaluation scale.

Figure 4:
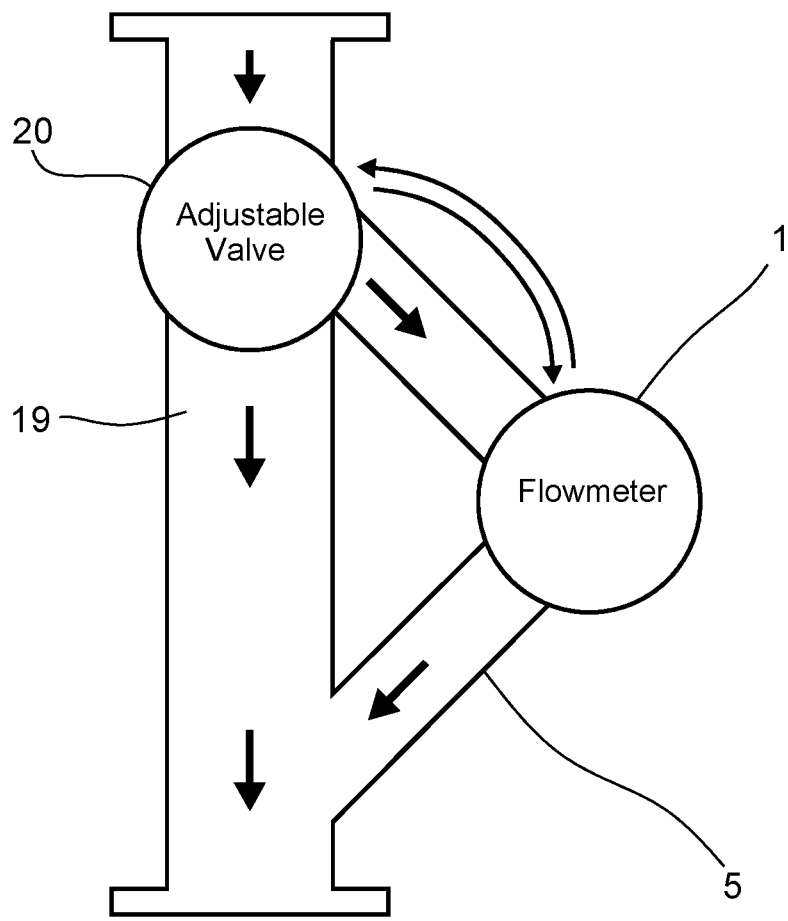
FIG. 4 shows a fourth embodiment of a variable area flowmeter according to the invention.

FIG. 4 shows an arrangement consisting of a first measuring tube 5 and a second measuring tube 19, wherein the first measuring tube 5 is designed and arranged as a bypass tube to the second measuring tube 19. A variable area flowmeter 1 is arranged on the first measuring tube 5, which records the flow through the first measuring tube 5 during operation and displays it via the display unit 3. The variable area flowmeter 1 shown has an internal control unit 9 which is not visible here.

An adjustable valve 20 regulates the flow ratio between the first measuring tube 5 and the second measuring tube 19. The valve 20 has a valve control unit which is connected to the internal control unit 9 of the variable area flowmeter 1 in such a manner that the internal control unit of the valve control unit transmits the flow value to be set for the flow flowing through the first measuring tube 5. The valve control unit sets the flow ratio value based on this setting and transmits this value to the internal control unit 9.

The internal control unit 9 is designed such that a correction value is determined from the flow ratio value, wherein the internal control unit 9 determines the total flow through the measuring tubes 5 and 19 using the correction value and the measured value of the flow through the first measuring tube 5. This total flow is displayed on the bi-stable display 6 and is continuously updated.

Figure 5:
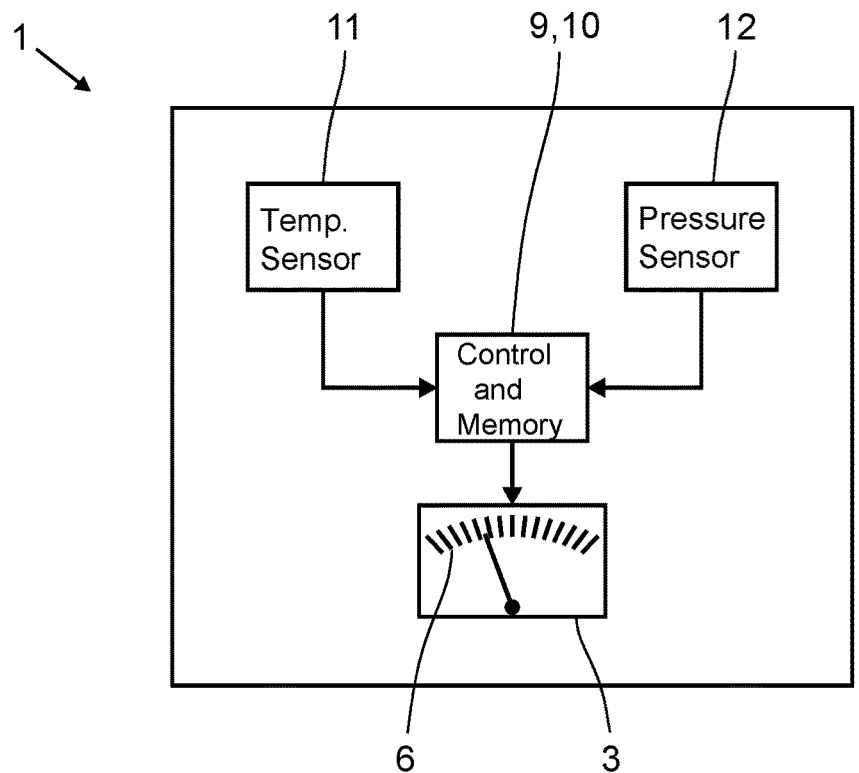
FIG. 5 shows a bypass configuration.

FIG. 5 schematically shows a further embodiment of a variable area flowmeter 1 having a float and a display unit 3 including a pointer element 4, wherein the pointer element 4 is mechanically deflected by the float during operation. In addition, the display unit 3 includes a bi-stable display 6.

In addition, the variable area flowmeter 1 has an internal control unit 9, wherein the internal control unit 9 also has a memory unit 10. The memory unit 10 contains representations of the value scale of the bi-stable display 6 for different process parameters.

In addition, a temperature sensor 11 and a pressure sensor 12 are provided, wherein the temperature sensor 11 and the pressure sensor 12 transmit the measured values to the internal control unit 9 during operation. During operation, the internal control unit 9 modifies the information shown by the bi-stable display 6 depending on the measured values of the temperature sensor 11 and the pressure sensor 12.

For this, the internal control unit 9 can either display a representation stored in the memory unit 10 or the value scale represented by the bi-stable display 6 can be converted to the values measured by the temperature sensor 11 and the pressure sensor 12.

Figure 6:
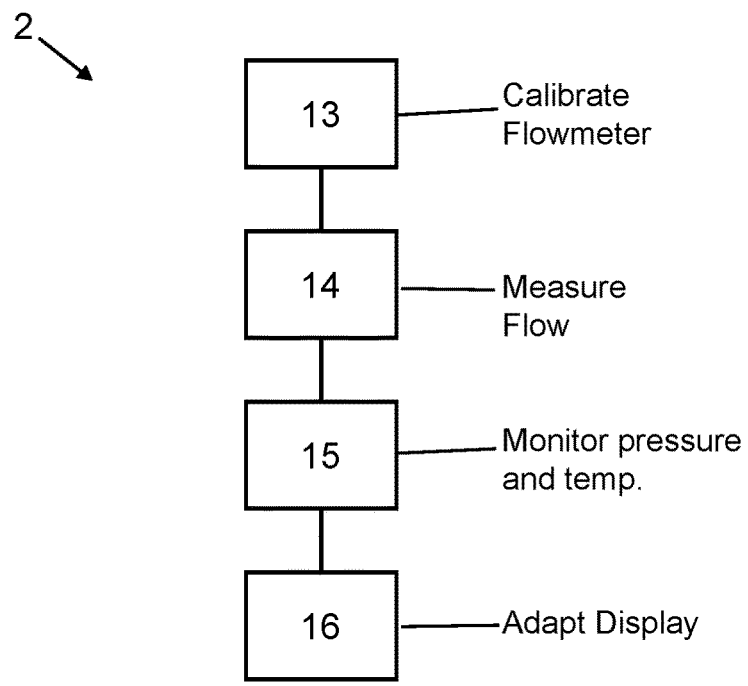
FIG. 6 is a flow chart of a first embodiment of a method according to the invention.

FIG. 6 shows a first embodiment of a method 2 for operating a variable area flowmeter 1, wherein the variable area flowmeter 1 is designed as shown in FIG. 5.

Before commissioning, the variable area flowmeter 1 is calibrated in a first step 13. For this, the position of the pointer element 4 is recorded both at different flow rates and at different process parameters and a plurality of value scales are created from this, which are stored in the memory unit 10 in the form of different representations.

Depending on the process parameters initially given, the bi-stable display 6 shows a first representation including a first value scale.

During measurement 14 of the flow of a medium flowing through a measuring tube, further process parameters such as pressure and temperature within the measuring tube are simultaneously monitored 15 by further sensor elements 11, 12. If the further process parameters exceed a tolerance range, the value scale is adapted 16 to the current process parameters by changing the display.

What is claimed is:

1. A variable area flowmeter, comprising:
   a float; and
   a display unit, wherein the display unit comprises a mechanical pointer element,
   wherein the pointer element is connected directly or indirectly to the float such that the pointer element is mechanically deflected by the float during a flow measuring process,
   wherein the display unit additionally comprises at least one bi-stable display, requiring energy supply only in order to modify a displayed representation or to restore the displayed representation, and
   wherein the at least one bi-stable display displays a first representation during operation, wherein the first representation comprises at least one scale dependent on the flow measuring range,
   wherein the displayed scale is modified depending on at least one further process parameter being measured, wherein the further process parameter is at least one of pressure, temperature, or type of measuring medium.

2. The variable area flowmeter according to claim 1, wherein the at least one bi-stable display is configured as a bi-stable e-paper display or as a bi-stable liquid crystal display.

3. The variable area flowmeter according to claim 1, wherein the display unit has an interface for connection to an external control unit, such as a USB interface or a manufacturer-specific interface.

4. The variable area flowmeter according to claim 1, wherein the variable area flowmeter has an internal control unit, wherein the internal control unit is arranged to restore or at least partially modify the displayed representation of the bi-stable display.

5. The variable area flowmeter according to claim 4, wherein the internal control unit has a memory unit, wherein a plurality of individual representations of the display unit is stored in the memory unit, wherein the individual representations are based on different process parameters.

6. The variable area flowmeter according to claim 4, further comprising at least one sensor element for measuring at least one further parameter, wherein the at least one sensor element is connected in such a manner to the internal control unit, that, during Operation, the measured value of the at least one further parameter is transmitted to the internal control unit, wherein the internal control unit is configured to modify a representation of the at least one bi-stable display at least partially depending on the measured value of the at least one sensor element.

7. The variable area flowmeter according to claim 4, wherein the variable area flowmeter is arranged in a bypass configuration, and that the internal control unit is arranged to at least partially modify the displayed representation of the at least one bi-stable display depending on a flow ratio value.

8. The variable area flowmeter according to claim 1, further comprising a fixed value scale, wherein the mechanical pointer is arranged relative to the fixed scale and to the at least one further process-relevant parameter or evaluation displayed by the bi-stable display such that the deflected pointer is directed to both a value on the fixed scale and to the at least one process-relevant parameter or evaluation of the at least one bi-stable display.

9. The variable area flowmeter according to claim 8, wherein the fixed value scale is a mechanical scale.

10. The variable area flowmeter according to claim 1, wherein the at least one bi-stable display displays the first representation during operation, wherein the first representation further comprises at least one further process-relevant parameter or an evaluation of the displayed measured values in the form of an evaluation scale, or a limit value or a total flow.

11. A method for operating a variable area flowmeter, comprising:
 altering a representation of a bi-stable display of a display unit at least partially, depending on at least one process parameter, by an internal control unit or an external control unit, wherein the display unit comprises a pointer element; and
 deflecting mechanically the pointer element by the variable area flowmeter during a flow measuring process,
 wherein the pointer element is connected directly or indirectly to a float for the pointer element to be deflected mechanically by the variable area flowmeter during the flow measuring process,
 wherein the bi-stable display requires energy supply only for changing the representation or for restoring the representation,
 wherein the at least one bi-stable display displays a first representation during operation, wherein the first representation comprises at least one scale dependent on the flow measuring range, and
 wherein the displayed scale is modified depending on the further process parameter being measured, wherein the further process parameter is at least one of pressure, temperature, or type of measuring medium.

12. The method for operating a variable area flowmeter according to claim 11, wherein the deflected pointer points to both a value on a fixed value scale and to the at least one process-relevant parameter or an evaluation of the displayed measured values of the at least one bi-stable display.

* * * * *